United States Patent Office.

A. AGNEW THOMSON, OF NEWBURG, PENNSYLVANIA.

Letters Patent No. 97,459, dated November 30, 1869.

IMPROVED MEDICAL COMPOUND.

The Schedule referred to in these Letters Patent and making part of the same.

*To all whom it may concern:*

Be it known that I, A. AGNEW THOMSON, M. D., of Newburg, in the county of Cumberland, in the State of Pennsylvania, have invented a Soothing Sirup for Children; and I do hereby declare that the following is a full and exact description of the composition, mode of perforation, and effects.

To enable others skilled in the art to make and use my preparation, I will give the composition, mode of preparation, dose, and effects on the system, of my soothing-sirup.

*Dr. Agnew Thomson's Soothing-Sirup.*

Fluid extract catnip, ℥iss.
Tincture lupuline, ℥iss.
Carbonate potassa, ℥iss.
Oil aniseed, ℥ss.
Sulphate morphia, ℈ij.
Alcohol, pt. j.

Add enough simple sirup to make the whole measure one gallon.

The mode of preparing the soothing-sirup is: Take two quarts of simple sirup, made by dissolving six pounds of white sugar, with the aid of a gentle heat, in one gallon of distilled water; add the carbonate of potassa; then dissolve the oil of aniseed in the alcohol, and add to the sirup, stirring the mixture frequently. Then add the fluid extract of catnip and tincture of lupuline; dissolve the sulphate of morphia in four ounces of water, and add. Lastly, add a sufficient quantity of the simple sirup to make the whole measure one gallon. Mix thoroughly.

The dose for a child under two weeks old, from four to six drops; one month old, eight to twelve drops; two months old, twenty drops; three months old, thirty drops; six months to one year old, half a teaspoonful.

The effects, on the system, of my preparation, are that of a tonic, sedative, anodyne, and anti-spasmodic, and therefore very beneficial in all cases of fretful or nervous children, from whatever cause, as it acts as a tonic to the digestive system, relieves pain or restlessness, and contains enough carbonate potassa to correct all acidity, or sour stomach, and keep the bowels regular, and in a healthy condition.

The morphia acts as a sedative and anodyne in relieving pain and restlessness.

The tincture lupuline, fluid extract catnip, and oil aniseed, act as an anti-spasmodic and tonic in relieving colic, nervousness, and giving tone or strength to the stomach.

The alcohol prevents fermentation, and has a beneficial effect, when a stimulant is necessary.

The soothing-sirup was discovered in August, 1868, and very successfully used ever since; hence ask for protection in having it patented. (Used in my private practice.)

Having now described all that relates to my invention, and which is necessary to full understanding thereof,

What I claim as of my invention, and desire to protect by Letters Patent, is—

The sirup above described, composed of the ingredients named, each being in the proportion specified, and all being prepared and mixed in the manner set forth.

A. AGNEW THOMSON, M. D.

Witnesses:
JOHN W. HALE,
SAMUEL SKELLY.